US007577463B2

United States Patent
Zheng et al.

(10) Patent No.: US 7,577,463 B2
(45) Date of Patent: Aug. 18, 2009

(54) FAST BOOTING METHOD FOR MOBILE COMMUNICATION DEVICE

(75) Inventors: Yong-Ping Zheng, Taipei (TW); Wei-Jun Pan, Shanghai (CN); Jing Wang, Shanghai (CN); David Ho, Taipei (TW)

(73) Assignee: Inventec Appliances Corp., Taipei (TW)

( * ) Notice: Subject to any disclaimer, the term of this patent is extended or adjusted under 35 U.S.C. 154(b) by 459 days.

(21) Appl. No.: 11/404,884

(22) Filed: Apr. 17, 2006

(65) Prior Publication Data

US 2006/0234773 A1    Oct. 19, 2006

(30) Foreign Application Priority Data

Apr. 18, 2005    (TW) ............................. 94112328 A

(51) Int. Cl.
   *H04B 1/38* (2006.01)
(52) U.S. Cl. .................. 455/558; 455/418; 455/412.1; 455/550.1
(58) Field of Classification Search ............. 455/558, 455/418, 412.1, 550.1, 557, 556.1, 425
   See application file for complete search history.

(56) References Cited

U.S. PATENT DOCUMENTS

| 6,694,134 | B1 * | 2/2004 | Lu et al. ................... 455/419 |
| 7,031,704 | B2 * | 4/2006 | Di Claudio et al. ....... 455/432.1 |
| 7,146,161 | B2 * | 12/2006 | Chou ........................ 455/418 |
| 2003/0038791 | A1 * | 2/2003 | Chou ........................ 345/204 |
| 2004/0042442 | A1 * | 3/2004 | Pecen et al. ............... 370/352 |
| 2006/0291455 | A1 * | 12/2006 | Katz et al. ................. 370/355 |
| 2007/0105532 | A1 * | 5/2007 | Martin et al. ............ 455/412.1 |

* cited by examiner

Primary Examiner—Joseph H Feild
Assistant Examiner—Huy D Nguyen
(74) Attorney, Agent, or Firm—Muncy, Geissler, Olds & Lowe, PLLC

(57) ABSTRACT

The invention discloses a fast booting method for a mobile communication device. This method is accomplished by dividing a memory module of a mobile communication device into two areas, a virtual identity module storage and a mobile communication data storage. The virtual identity storage can store the set of data of a subscriber identity module as a virtual identity module. By reading the data of a virtual identity module the purpose of fast booting the mobile communication device can be achieved.

8 Claims, 6 Drawing Sheets

US 7,577,463 B2

FAST BOOTING METHOD FOR MOBILE COMMUNICATION DEVICE

BACKGROUND OF THE INVENTION (1) Field of the Invention

The present invention relates to a method of fast booting mobile communication device, especially to a mobile communication device comprising a virtual identity module storage for a fast booting process.

(2) Description of the Prior Art

With fast progress of whole society, it is more and more important for people to choose portable apparatus with the capability of saving time. Please refer to FIG. 1, which shows a flow chart of accessing data from a functioning phone. Firstly, the operator needs to open the file which contains the data he wants (STEP 11, S11), for instance, the data could be phone number files, short or multimedia messages, and herein we presume that the operator is searching for phone number files. Secondly, the operator accesses the phone number data (STEP12, S12) and then dials the phone number (STEP13, S13).

Nowadays lots people have more than one SIM card. While needing data within another SIM card, people need to reboot his mobile phone for replacing another SIM card. Please refer to FIG. 2, which shows a flow chart of accessing data from a general mobile phone needing to be rebooted. The process of the flow chart comprises:

STEP21 (S21): shutting off the mobile phone for replacing the battery or the SIM card;

STEP22 (S22): rebooting the mobile phone;

STEP11 (S11): opening the file containing the data that operator needs; herein the data could be phone number files, short or multimedia messages and we presume that the operator is searching for phone number files.

STEP23 (S23): the monitor of the mobile phone showing "please wait for accessing the data" for a period of time;

STEP12 (S12): accessing the phone number data to be needed;

STEP13 (S13): dialing the phone number.

The process mentioned herein takes longer time than the process described in FIG. 1. Please refer to FIG. 3, which shows a flow chart of booting a general mobile phone. The booting process comprises:

STEP31 (S31): booting the mobile communication device (the mobile phone);

STEP32 (S32): automatically accessing the data in the subscriber identity card and the memory module;

STEP33 (S33): completing the Man-Machine Interface (MMI) initial programming process;

STEP34 (S34): starting to operate the mobile communication device (the mobile phone).

The step 32 of the booting process mentioned above takes longer time comparing to other steps, and hence more data stored in the subscriber identity card, more time it has to take to complete the booting process.

However, the subscriber identity card provides a convenient manner for storing and transmitting data from one mobile phone to another, and hence the advantage of storing and transmitting data comes along with the disadvantage of longer time booting.

SUMMARY OF THE INVENTION

The object of the present invention is to provide a fast booting method for a mobile communication device.

Accordingly, the invention discloses a fast booting method for a mobile communication device. According to a principle that the rate of accessing from the memory module is faster than that of accessing from a subscriber identity module, this method is accomplished by dividing a memory module of a mobile communication device into two areas, a virtual identity module storage and a mobile communication data storage. The virtual identity storage can store the set of data of a subscriber identity module as a virtual identity module. By reading the data in a virtual identity module the purpose of fast booting the mobile communication device can be achieved.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
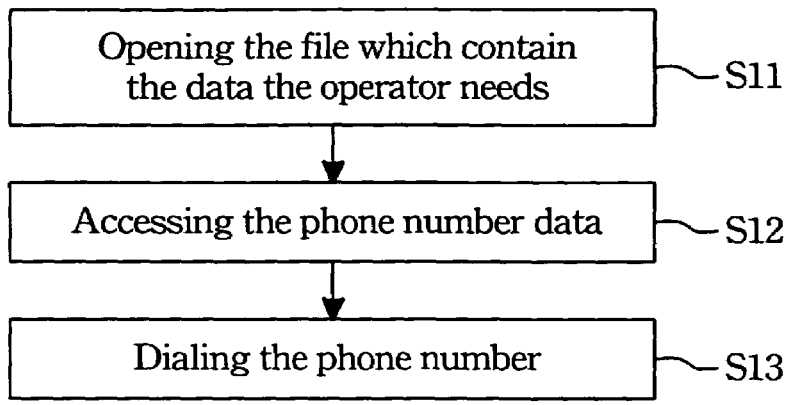
FIG. 1 shows a flow chart of accessing data from a functioning phone.
Figure 2:
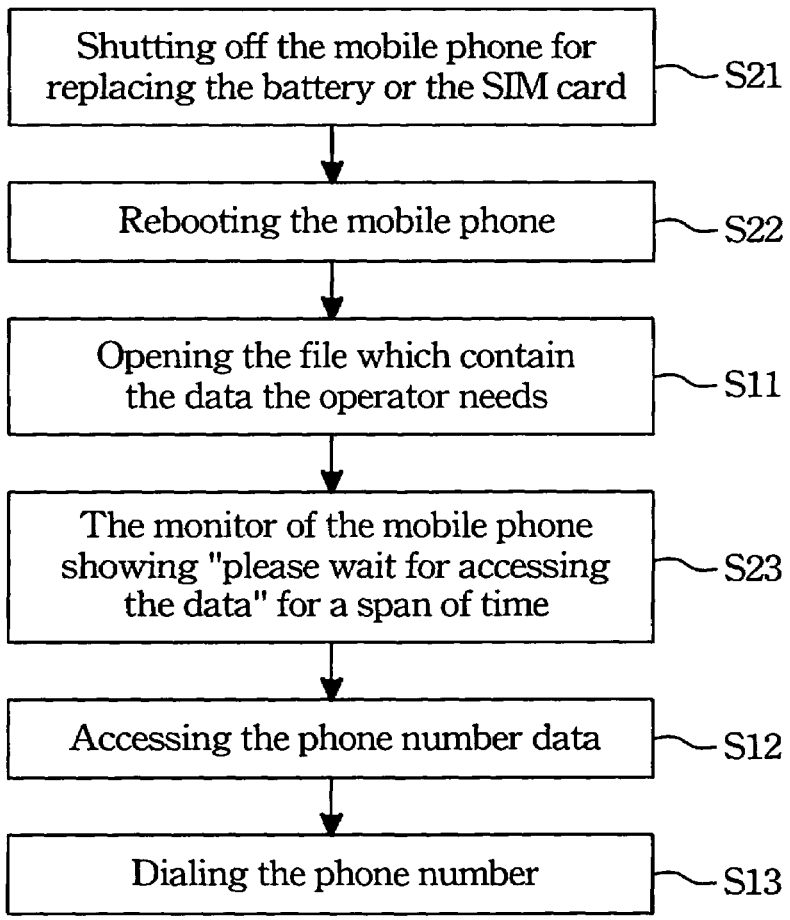
FIG. 2 shows a flow chart of accessing data from a general mobile phone needing to be rebooted.
Figure 3:
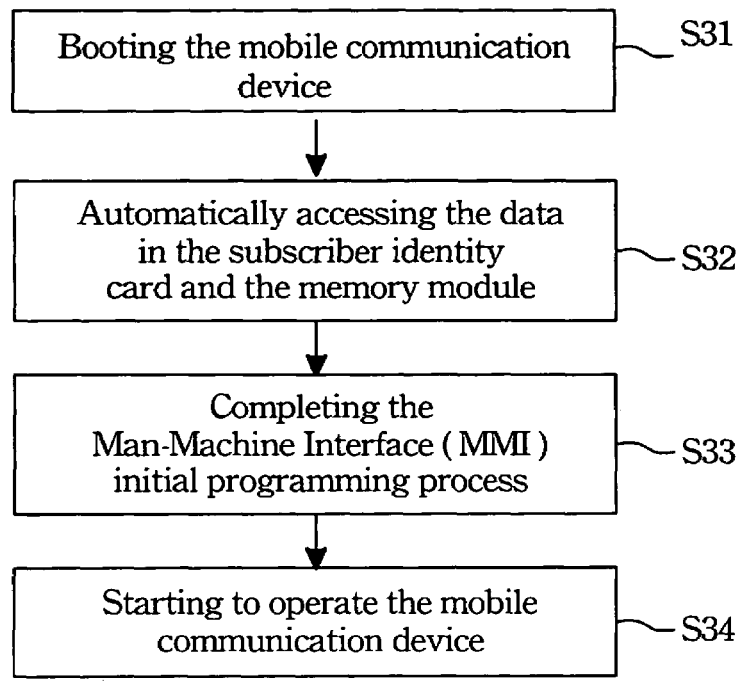
FIG. 3 shows a flow chart of booting a general mobile phone.
Figure 4:
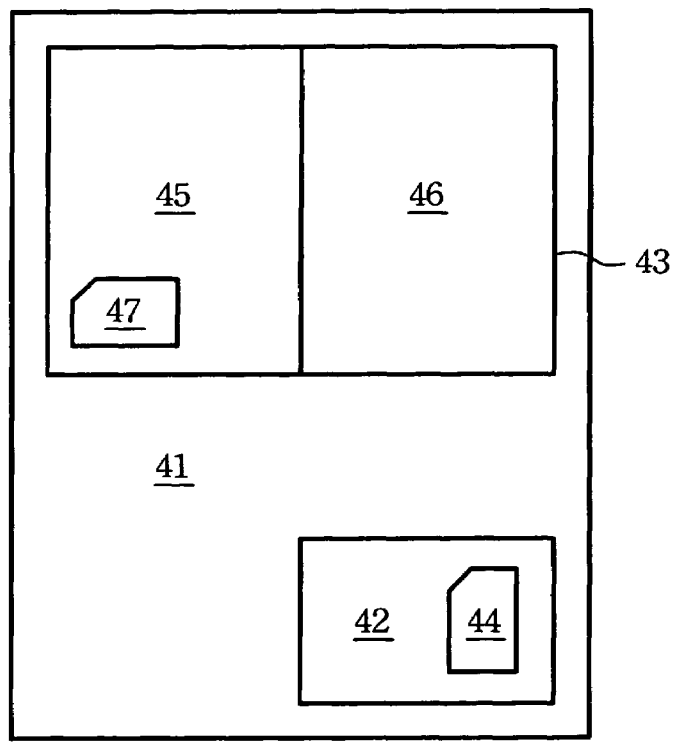
FIG. 4 is a structure diagram of one embodiment according to the present invention.

The present invention discloses a method of fast booting a mobile communication device. Please refer to FIG. 4, which is a structure diagram of one embodiment according to the present invention. The mobile communication device 41 comprises an identity module 42 and a memory module 43. The identity module 42 further comprises at least a subscriber identity card 44 and the memory module 43 comprises at least one virtual identity module storage 45 and one mobile communication data storage 46. The data within the subscriber identity card 44 could be copied to the virtual identity module storage 45 as a virtual subscriber identity card 47, and herein the virtual identity module storage 45 could access at least one set of data from the virtual subscriber identity card 47.

Figure 5:
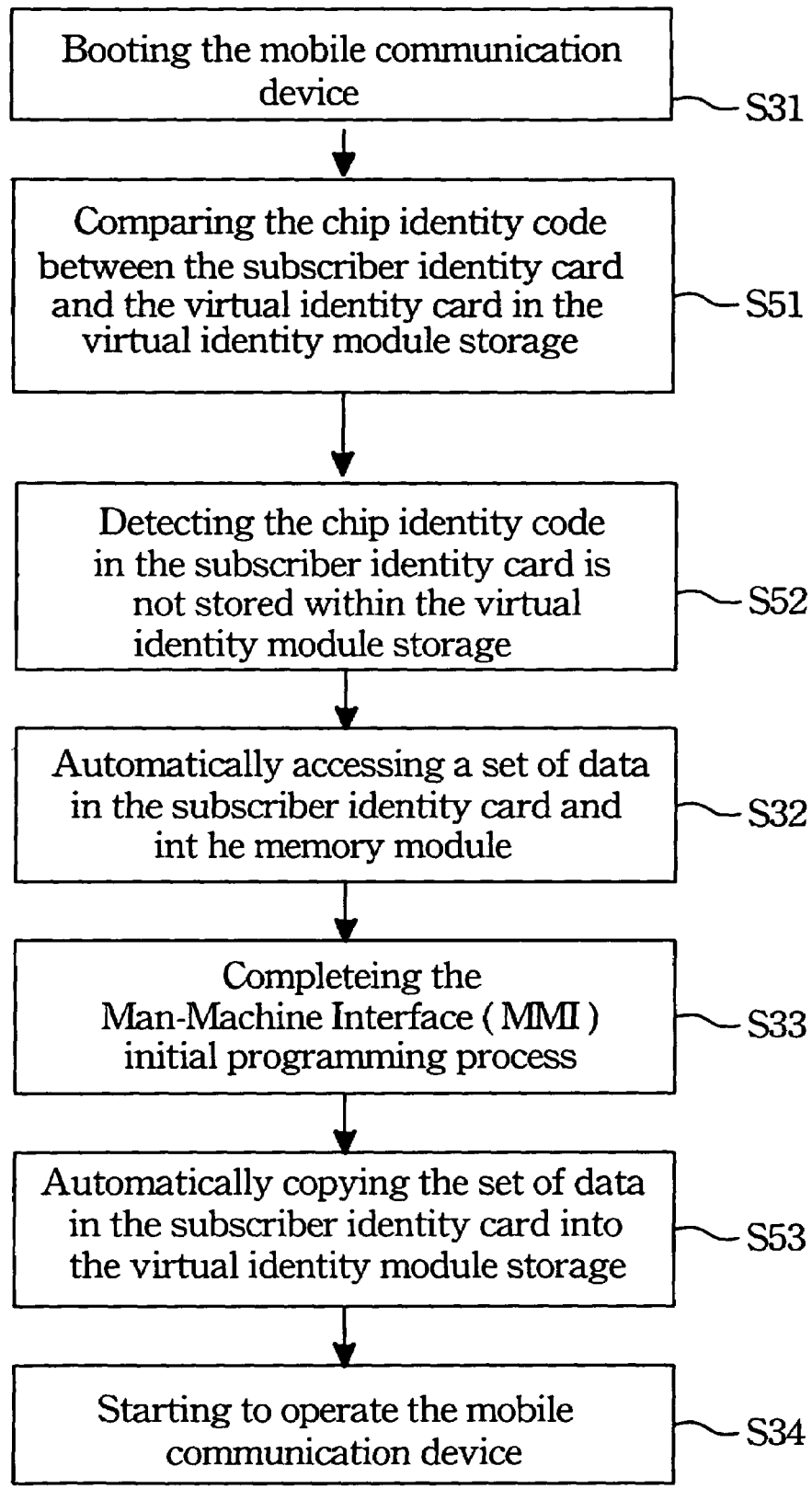
FIG. 5 is a flow chart of one embodiment according to the present invention.
Figure 6:
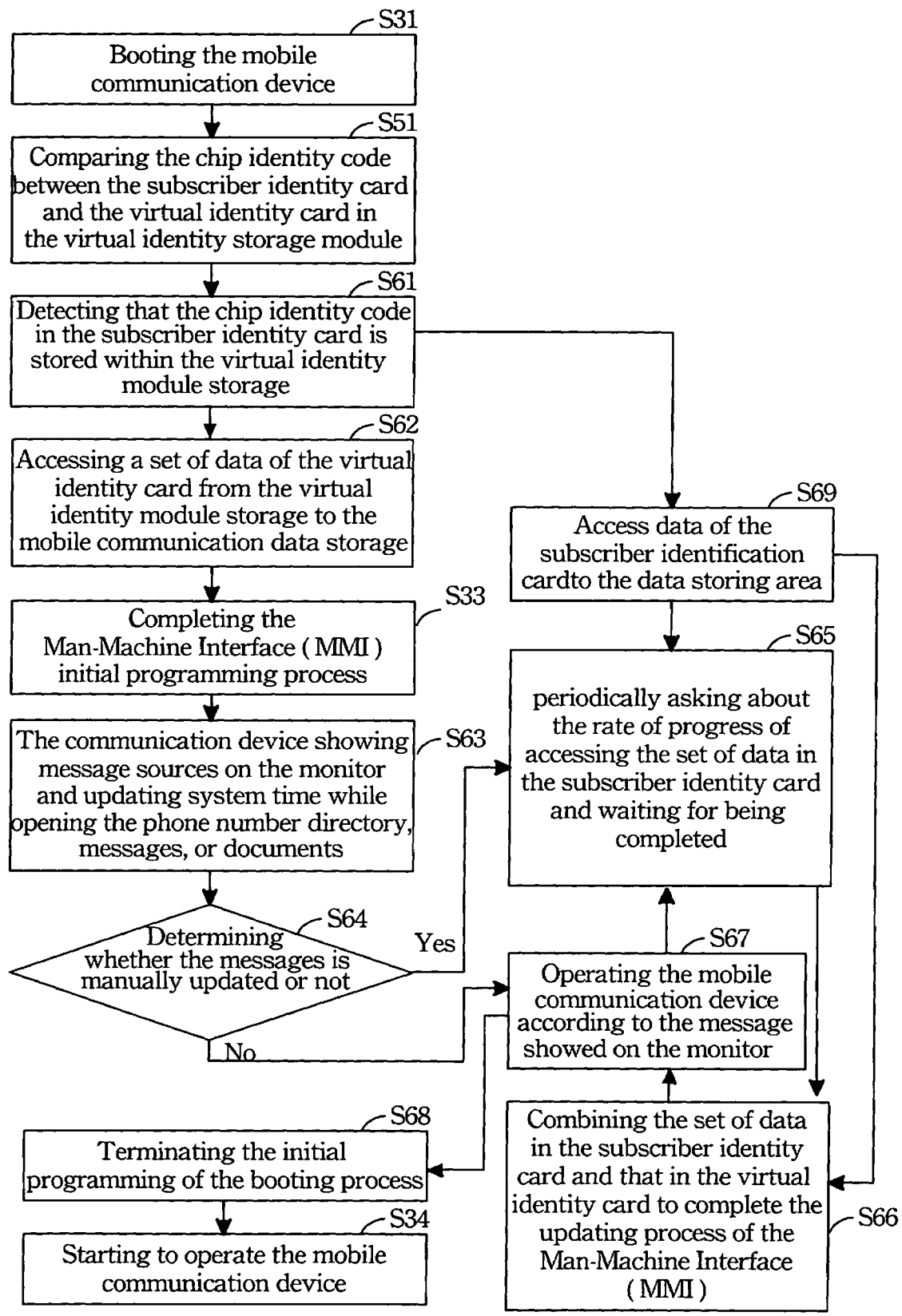
FIG. 6 is a flow chart of using the subscriber identity card second time in the mobile communication device.

Please refer to FIG. 5, which is a flow chart of one embodiment according to the present invention. FIG. 5 shows a fast booting method for a mobile communication device 41 while replacing the subscriber identity card 44 with a new one. The method comprises:

Step31 (S31): booting the mobile communication device 41;

Step51 (S51): comparing the chip identity code between the subscriber identity card 44 and the virtual identity card 47 in the virtual identity module storage 45;

Step52 (S52): detecting that the chip identity code in the subscriber identity card 44 is not stored within the virtual identity module storage 45;

Step32 (S32): automatically accessing a set of data in the subscriber identity card 44 and in the memory module 43;

Step33 (S33): completing the Man-Machine Interface (MMI) initial programming process;

Step34 (S34): starting to operate the mobile communication device, for instance, searching for phone numbers and browsing short or multimedia messages;

Step53 (S53): automatically copying the set of data in the subscriber identity card 44 into the virtual identity module storage 45;

Next, please refer to FIG. 6, which is a flow chart of using the subscriber identity card 44 second time in the mobile communication device 41. The method of FIG. 6 comprises:

Step31 (S31): booting the mobile communication device 41;

Step51 (S51): comparing the chip identity code between the subscriber identity card 44 and the virtual identity card 47 in the virtual identity module storage 45;

Step61 (S61): detecting that the chip identity code in the subscriber identity card 44 is stored within the virtual identity module storage 45;

Step62 (S62): reading and writing a set of data of the virtual identity card 47 from the virtual identity module storage to the mobile communication data storage 46;

Step33 (S33): completing the Man-Machine Interface (MMI) initial programming process;

Step63 (S63): the mobile communication device showing message sources on the monitor and updating system time while opening the phone number directory, messages, or documents;

Step64 (S64): determining whether the messages is manually updated or not, if yes, going on to step65; if no, going on to step 67, Step65 (S65): periodically asking about the rate of progress of accessing the set of data in the subscriber identity card 44 and waiting for being completed, Step66 (S66): combining the set of data in the subscriber identity card 44 and that in the virtual identity card 47 to complete the updating process of the Man-Machine Interface (MMI);

Step67 (S67): operating the mobile communication device according to the message contents showed on the monitor;

Step68 (S68): terminating the initial programming of the booting process;

Step34 (S34): starting to operate the mobile communication device, for instance, searching for phone numbers and browsing short or multimedia messages.

Additionally, step 69 and step62 are executed at the same time, wherein the base system of the mobile communication device copies the set of data in the subscriber identity card 44 to the mobile communication data storage 46 and then the set of data of MMI will be updated automatically. The process mentioned herein can also be regulated by a user anytime (Step671, S671).

Figure 7:
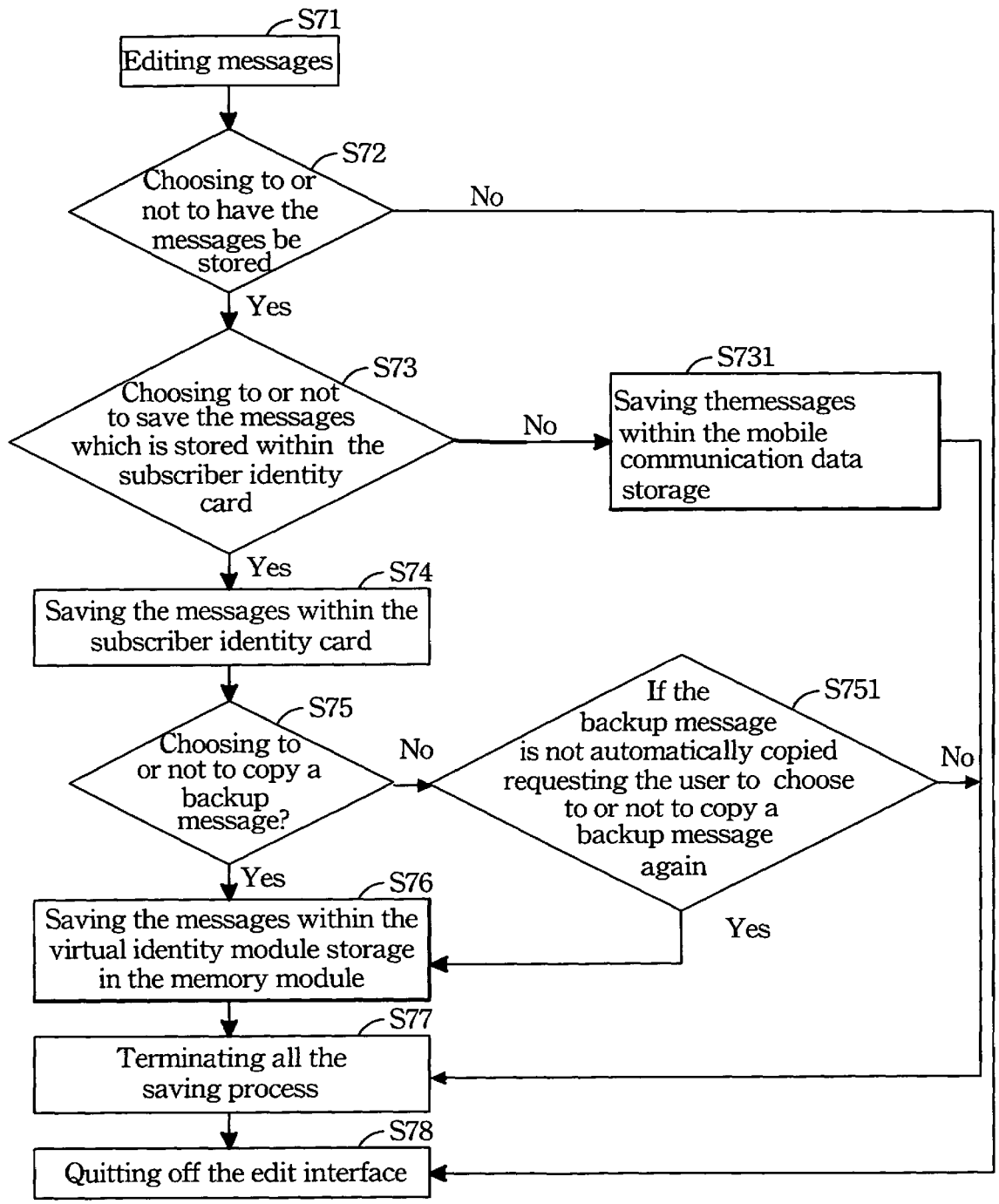
FIG. 7 is a flow chart of showing a storing data process of the present invention.

Please refer to FIG. 7, which is a flow chart of showing a storing data process of the present invention.

After the mobile communication device 41 shows the editing interface, the following process comprises:

Step71 (S71): editing messages;

Step72 (S72): the user choosing to or not to have the messages be stored, if yes, going on to step 73; if no, quitting the edit interface;

Step73 (S73): the user choosing to or not to save the messages which is stored within the subscriber identity card 44, if yes, going on to step 74; if no, going on to step 731;

Step731 (S731): saving the messages within the mobile communication data storage 46;

Step74 (S74): saving the messages within the subscriber identity card 44;

Step75 (S75): the user choosing to or not to copy a backup message, if yes, going on to step76; if no, going on to step751;

Step751 (S751): if the backup message is not automatically copied, requesting the user to choose to or not to copy a backup message again, if yes, going on to step76; if no, going to step 77;

Step76 (S76): saving the messages within the virtual identity module storage 45 in the memory module 43;

Step77 (S77): terminating all of the saving process;

Step78 (S78): quitting off the editing interface.

Figure 8:
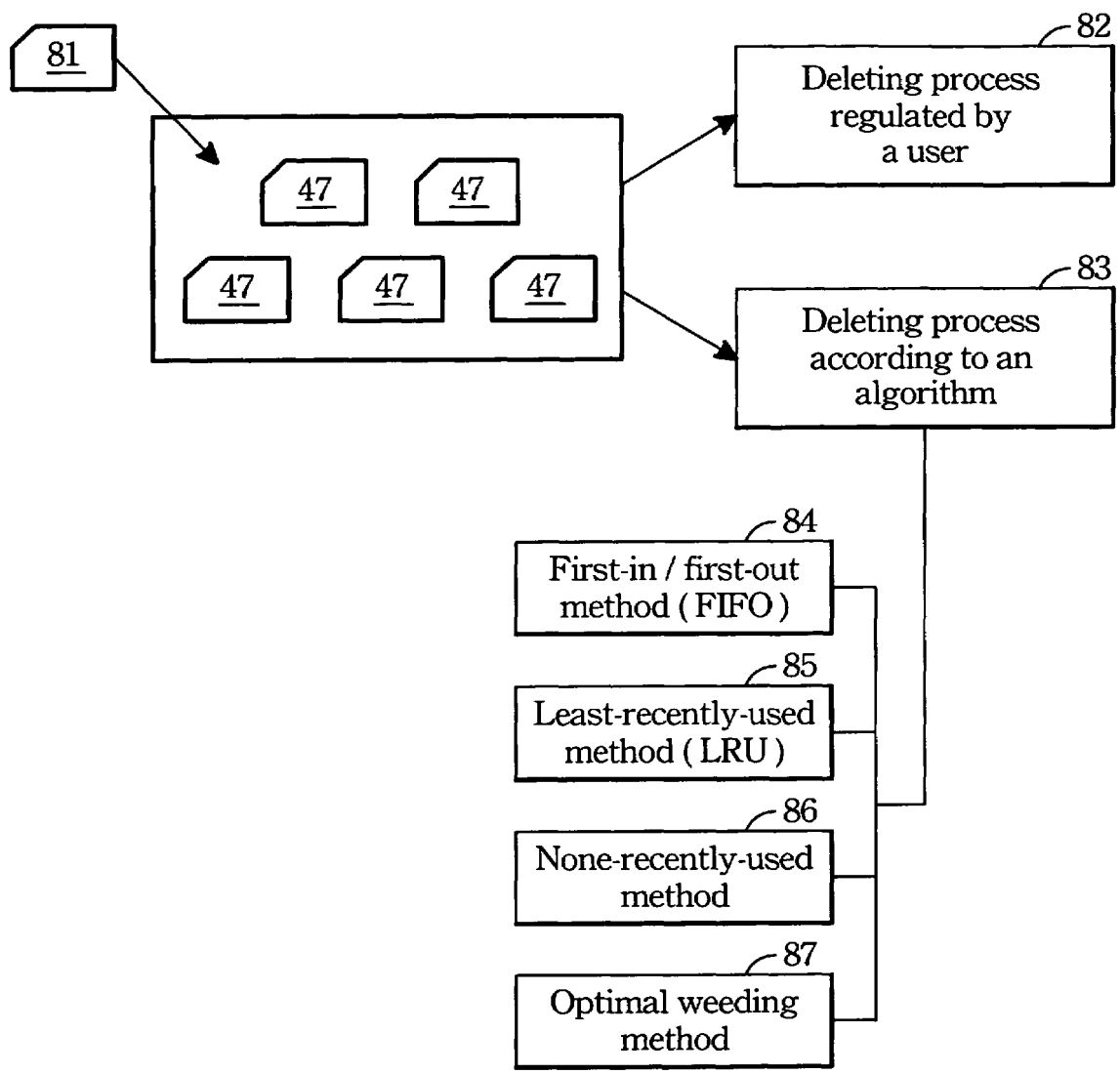
FIG. 8 shows the diagram of depicting how the whole system of the mobile communication device operates a deleting process.

Please refer to FIG. 8, which shows the diagram depicting how the whole system of the mobile communication device 41 operates a deleting process. As shown, the virtual identity module storage 45 may store a plurality set of data of the virtual identity card 47; herein there are five sets of data stored. While the capacity of the virtual identity module storage is fully occupied, a deleting process is necessary for saving a set of data of a sixth subscriber identity card 81 within the virtual identity module storage 45. The deleting process is regulated by a user 82, or is according to an algorithm 83. The algorithm 83 comprises a first-in/first-out method (FIFO) 84, a least-recently-used method (LRU) 85, a none-recently-used method 86, and an optimal weeding method 87.

While the present invention has been particularly shown and described with reference to a preferred embodiment, it will be understood by those skilled in the art that various changes in form and detail may be without departing from the spirit and scope of the present invention

What is claimed is:

1. A fast booting method for a mobile communication device comprising:

providing a memory module within the mobile communication device, wherein the memory module comprises a virtual identity module storage and a mobile communication data storage;

providing an identity module within the mobile communication device;

determining whether, or not, a set of data in the identity module is stored in the virtual identity module storage to represent a virtual identity module;

if the set of data in the identity module is not stored in the virtual identity module storage, copying the set of data in the identity module into the virtual identity module storage to represent the virtual identity module and then reading and writing the set of data of the virtual identity module to the mobile communication data storage for carrying out a following booting process;

if the set of data in the identity module is stored in the virtual identity module storage, reading and writing the set of data of the virtual identity module from the virtual identity module storage to the mobile communication data storage for carrying out the following booting process; and carrying out a deleting process for deleting a set of data stored in the virtual identity module storage different from said the set of data in the identity module, if the virtual identity module storage is incapable of storing any more set of data stored in the identity module.

2. The method of claim 1, wherein the mobile communication device is a mobile phone.

3. The method of claim 1, wherein the identity module comprises a subscriber identity module (SIM) card.

4. The method of claim 3, wherein the set of data stored in the identity module represents the subscriber identity module (SIM) card.

5. The method of claim 1 further comprising carrying out a comparing process after carrying out the booting process, for determining whether the set of data stored in the identity module and in the virtual identity module storage are the same or not; and if both of the set of data are different, copying the set of data in the identity module into the virtual identity module storage.

6. The method of claim 5, wherein the difference between both of the set of data lies in at least a phone number file, at least a short message, or at least a multimedia message.

7. The method of claim 1, wherein the deleting process is regulated by a user, or is according to an algorithm.

8. The method of claim 7, wherein the algorithm comprises a first-in/first-out method (FIFO), a least-recently-used method (LRU), a none-recently-used method, or an optimal weeding method.

\* \* \* \* \*